|  |

(12) United States Patent
Fang et al.

(10) Patent No.: US 8,942,362 B2
(45) Date of Patent: Jan. 27, 2015

(54) COMMUNICATION ADMINISTRATION SYSTEM

(71) Applicant: Quanta Computer Inc., Tao Yuan Shien (TW)

(72) Inventors: Tien-Chin Fang, Taoyuan County (TW); Chen-Chung Lee, Nantou County (TW); Ping-Chi Lai, Taoyuan County (TW); Chia-Hung Lin, New Taipei (TW); Ming-Jen Chen, New Taipei (TW); Ching-Wen Lin, Taoyuan County (TW); Ching-Yu Tsai, New Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 0 days.

(21) Appl. No.: 14/048,466

(22) Filed: Oct. 8, 2013

(65) Prior Publication Data

US 2014/0369482 A1 Dec. 18, 2014

(30) Foreign Application Priority Data

Jun. 18, 2013 (TW) .............................. 102121577 A

(51) Int. Cl.
*H04M 15/00* (2006.01)
*H04M 3/42* (2006.01)

(52) U.S. Cl.
CPC ................................ *H04M 3/42357* (2013.01)

USPC ............ 379/114.02; 379/114.03; 379/114.06; 379/115.01

(58) Field of Classification Search
USPC .......... 379/121.01, 121.06, 196, 198, 201.01, 379/265.02, 114.02, 114.03, 114.06, 379/114.09, 115.01, 115.02, 115.03, 121.03
See application file for complete search history.

(56) References Cited

U.S. PATENT DOCUMENTS 7,801,113 B2 * 9/2010 Gass et al. ..................... 370/352
2005/0025302 A1 * 2/2005 Schmid et al. ............ 379/221.15

FOREIGN PATENT DOCUMENTS

EP 0872998 A1 * 10/1998
WO WO 02075495 A2 * 9/2002

* cited by examiner

*Primary Examiner* — Binh Tieu
(74) *Attorney, Agent, or Firm* — Rabin & Berdo, P.C.

(57) ABSTRACT

A communication administration system includes: a administration system, for managing basis information of at least one user; and a service system, for fetching basic information and current location information of a called party from the administration system in response to a communication request from a calling party, obtaining current location information and preference information of the called party from the called party, and generating a communication mechanism scenario according to a communication mechanism system for the calling party to make a selection and to make a call accordingly.

9 Claims, 4 Drawing Sheets

COMMUNICATION ADMINISTRATION SYSTEM

This application claims the benefit of Taiwan application Serial No. 102121577, filed Jun. 18, 2013, the subject matter of which is incorporated herein by reference.

BACKGROUND

1. Technical Field

The disclosure relates in general to a communication administration system, and more particularly to a communication administration system capable of dynamically adjusting a communication mechanism.

2. Description of the Related Art

In certain megacorporations and even multinational corporations, in order to facilitate communications within the corporation, apart from allowing corporate staff to communication with one another through landlines, various communication mechanisms (e.g., virtual dedicated networks, Internet phones and mobile phone) are also provided by telecommunication service providers, so that mobile phones of corporate staff are given functions of landlines. As such, even when the corporate staffs are not in their seats, the corporate staff may still answer calls to their extensions using mobile phones rather than missing the phone calls.

However, the above communication mechanisms may not be entirely suitable for all application circumstances. Given that appropriate communication mechanisms are utilized by the corporate staff, costs and quality can be both attended to. Conversely, applications of inappropriate communication mechanisms may lead to increased communication costs or lowered communication quality.

As previously stated, the above communication mechanisms are suitable in some application circumstances while being unsuitable in others. With a growing number of communication mechanisms, corporate staff may face complications in selecting an appropriate communication mechanism as the corporate staffs are required to memorize numerous communication mechanisms and the corresponding communication rules. Further, if there is a change in a current condition (e.g., a current location, on a business trip or not, and personal preferences) of a corporate member, the member may be troubled as they may be required to select another communication mechanism.

SUMMARY OF THE DISCLOSURE

The disclosure is directed to a communication administration system capable of dynamically adjusting a communication mechanism according to preferences (e.g., costs and quality).

The disclosure is further directed to a communication administration system capable of dynamically adjusting a communication mechanism according to current user conditions (e.g., a current location of a user, whether the user is on a business trip or not, and user requirements).

According to an embodiment of the present disclosure, a communication administration system is provided. The communication administration system includes: an administration system, for managing a basic information of at least one user; and a service system, for fetching a basic information and a current location information of a called party from the administration system in response to a communication request from a calling party, obtaining a current location information and a preference information of the calling party from the calling party, and generating a communication mechanism scenario according to a communication mechanism systematic factor for the calling party to make a selection and make a call accordingly.

The above and other contents of the disclosure will become better understood with regard to the following detailed description of the preferred but non-limiting embodiments. The following description is made with reference to the accompanying drawings.

DETAILED DESCRIPTION OF THE DISCLOSURE

Technical terms of the application are based on general definitions in the technical field of the application. If the application describes or explains one or some terms, definitions of the terms are based on the description or explanation of the application. The description is given based on a communication mechanism selection, and common techniques or principles are omitted herein. Further, shapes, sizes, ratios and flow sequences are exemplary for one skilled person in the art to understand the application, not to limit the application.

Each of the disclosed embodiments has one or more technical features. However, it does not mean that implementation of the application needs every technical feature of any embodiment of the application or combination of the embodiments of the application is prohibited. In other words, in possible implementation, one skilled person in the art would selectively implement part or all technical features of any embodiment of the application or selectively combine part or all technical features of the embodiments of the application based on the disclosure of the application and one's own need. Implementation of the application is flexible.

The technical features of the embodiments of the disclosure are examples for one person skilled in the art to understand the disclosure and not to limit the disclosure. Besides, if the implementations are possible, one skilled person in the art may choose equivalent elements or steps to implement the disclosure based on the disclosure of the application. That is, the implementation of the disclosure is not limited by the embodiments described in the disclosure.

Further, for common elements in the embodiments of the disclosure, details of the common elements shall be omitted, given that a full disclosure is unaffected and one skilled person in the art is enabled to implement the embodiments of the disclosure.

Figure 1:
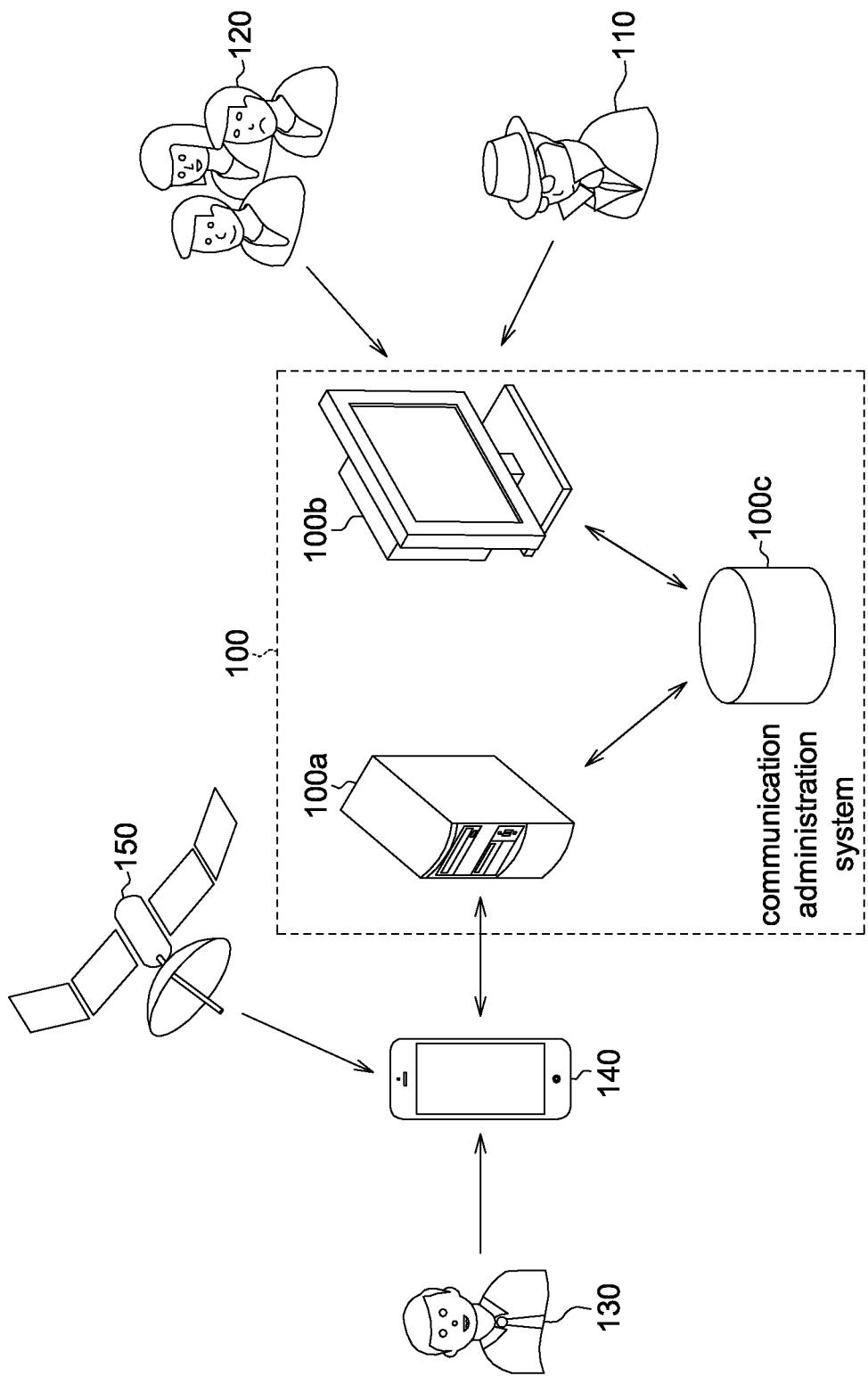
FIG. 1 shows a schematic diagram of a communication administration system according to an embodiment of the present disclosure.

FIG. 1 shows a schematic diagram of a communication administration system 100 according to an embodiment of the present disclosure. As shown in FIG. 1, the communication administration system 100 according to the embodiment of the present disclosure includes an application interface (API) service system 100*a*, an administration system 100*b* and a database 100*c*.

Referring to FIG. 1, through the administration system 100*b*, an administrator 110 inputs associated information of different factories/branch offices (e.g., geographic locations (may be represented by GPS locations), ranges, located countries and located regions of the different factories/branch offices) and a communication mechanism combination (e.g., dialing option, cost and quality) to the database 100*c*. For example, one of the dialing setting defines such as dialing a specific number (e.g., "0") first when making a call to an outside line.

A user 120 may provide information associated with business travels on the administration system 100*b* to store the information into the database 100*c*. For example, the information associated with business travels of the user 120 includes travel time and a travel destination.

When a calling party 130 wishes to make a call to a called party, the calling party 130 may select a desired called party through a portable device 140 (e.g., a mobile phone, or a tablet/laptop computer with a communication function), and enter a personal preference weighting (e.g., preferences, quality and costs) of the calling party 130. The portable device 140 is installed with an application program (not shown).

Further, location information of the calling party 130 may be, e.g., provided by a satellite 150, or input by the calling party 130.

Location information of the called party may be provided by the database 100*c* to the API service system 100*a*. That is, according to the location information of the factories/branch offices and travel information of the called party, the API service system 100*a* may identify the current location of the called party. According to the location of the calling party, the location of the called party, the preference weighting of the calling party and the communication combination rules, the API service system 100*a* then determines an optimal communication mechanism to accordingly generate a dial string for the calling party. The calling part proceeds to the communication with the called party according to the dial string received. Therefore, for the calling party, without knowing the current location of the called party nor the communication mechanism and the communication rules, the calling party is allowed to make a call according to the optimal communication mechanism established.

Further, during a call between the calling and called parties, the established optimal communication mechanism is not dynamically changed. That is, the optimal communication mechanism is established before the call between the calling party and the called party begins. Further, when at least one of the associated information changes, e.g., when at least one of the location of the calling/called party, the communication rules and the preferences of the calling party changes, the system needs to again establish the optimal communication mechanism. That is, the optimal communication mechanism previously established can remain unchanged if all of the associated information is unchanged.

Figure 2:
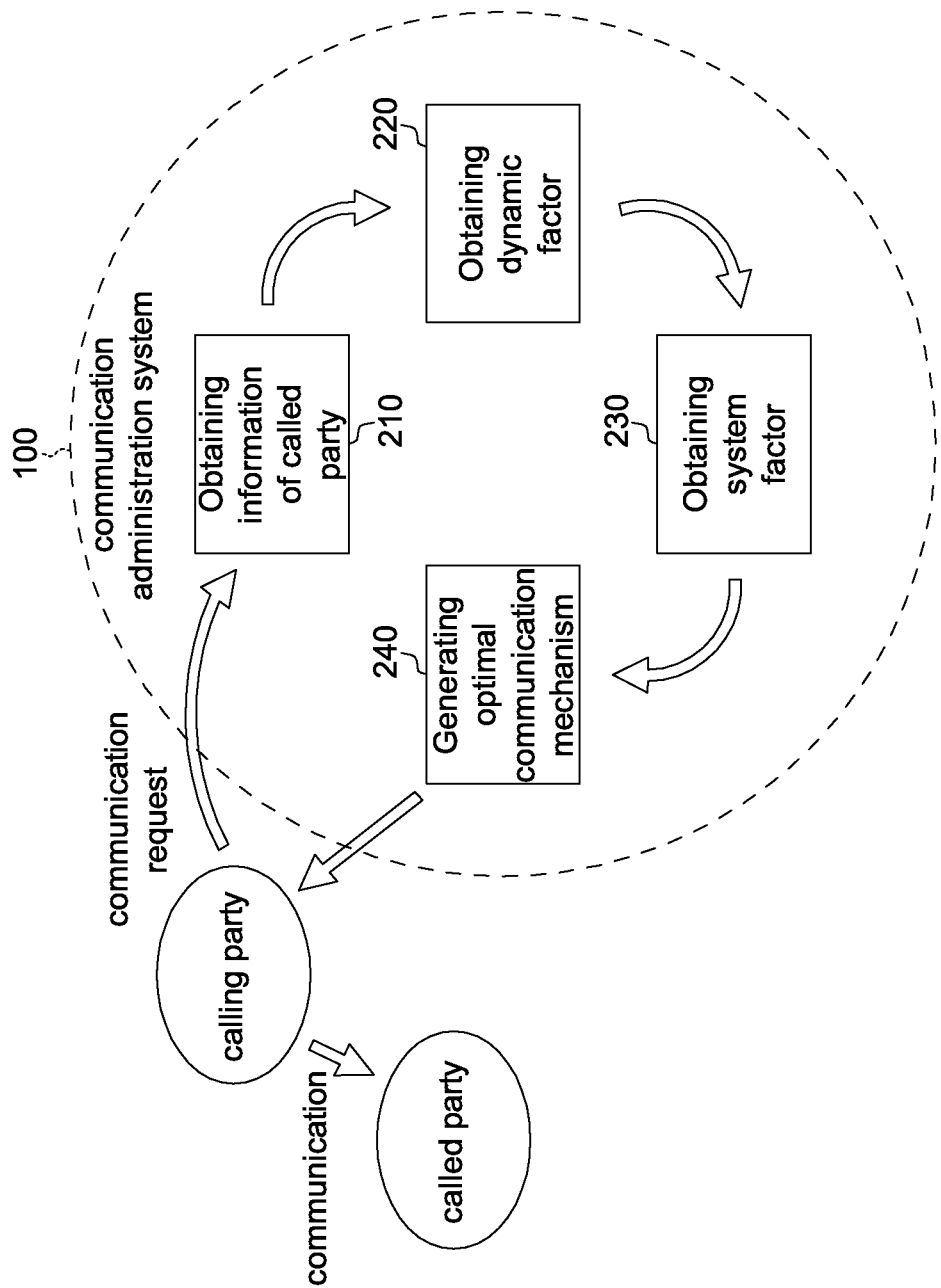
FIG. 2 shows a schematic diagram of establishing an optimal communication mechanism according to the embodiment of the present disclosure.

FIG. 2 shows a schematic diagram of establishing the optimal communication mechanism according to the embodiment of the present disclosure. For example, in the embodiment, if the corporation is regarded as a large group, the corporation staffs are members in the group. As shown in FIG. 2, a member sends a communication request to the communication administration system 100. In step 210, the communication administration system 100 obtains information of a called party. For example, the information of the called party may be a landline extension number, a cell phone number, a group number or any combination thereof. A contract is signed between a telecommunication service provider and the corporation. For example, the telecommunication service provider designs a customized virtual dedicated network for the corporation. According to different requirements of corporate clients, all corporate staffs are in the same group, and members within the group may dial a call to one another by dialing a simple code/group number and are privileged with rate discounts. Thus, within a coverage range of an exchanger, the corporate staff may call one another using telecommunication services provided by the telecommunication service provider. From perspectives of the contract, the corporation is regarded as a group, and the corporate staffs are regarded as members in the group, with each corporate staff being assigned with a group number.

In step 220, a dynamic factor is considered in establishing the optimal communication mechanism. For example, the dynamic factor may include travel conditions (e.g., time and destinations) of the called party or the location of the calling party.

In step 230, a system factor is considered in establishing the optimal communication mechanism. For example, the system factor may be a communication mechanism range (e.g., a coverage range of an exchanger), a communication mechanism setting condition (e.g., a member connects to a virtual dedicated network of a domestic office of the corporation first, and then the domestic virtual dedicated network in the corporation connects to an virtual dedicated network of an overseas branch office of the corporation), communication mechanism costs, communication rules or any combination thereof.

In step 240, the communication administration system 100 generates the optimal communication mechanism. That is, the communication administration system 100 determines the optimal communication mechanism according to the information of the called party, the dynamic factor, the system factor and the personal preferences of the calling party, and provides the optimal communication mechanism to the calling party. After the calling party receives the optimal communication mechanism provided by the communication administration system 100 via the portable device 140, the calling party may select a communication mechanism to be utilized for calling the called party through the portable device 140.

Therefore, without memorizing/knowing the various settings and rules, a member is able to make a call according to the optimal communication mechanism established by the communication administration system 100.

Figure 3:
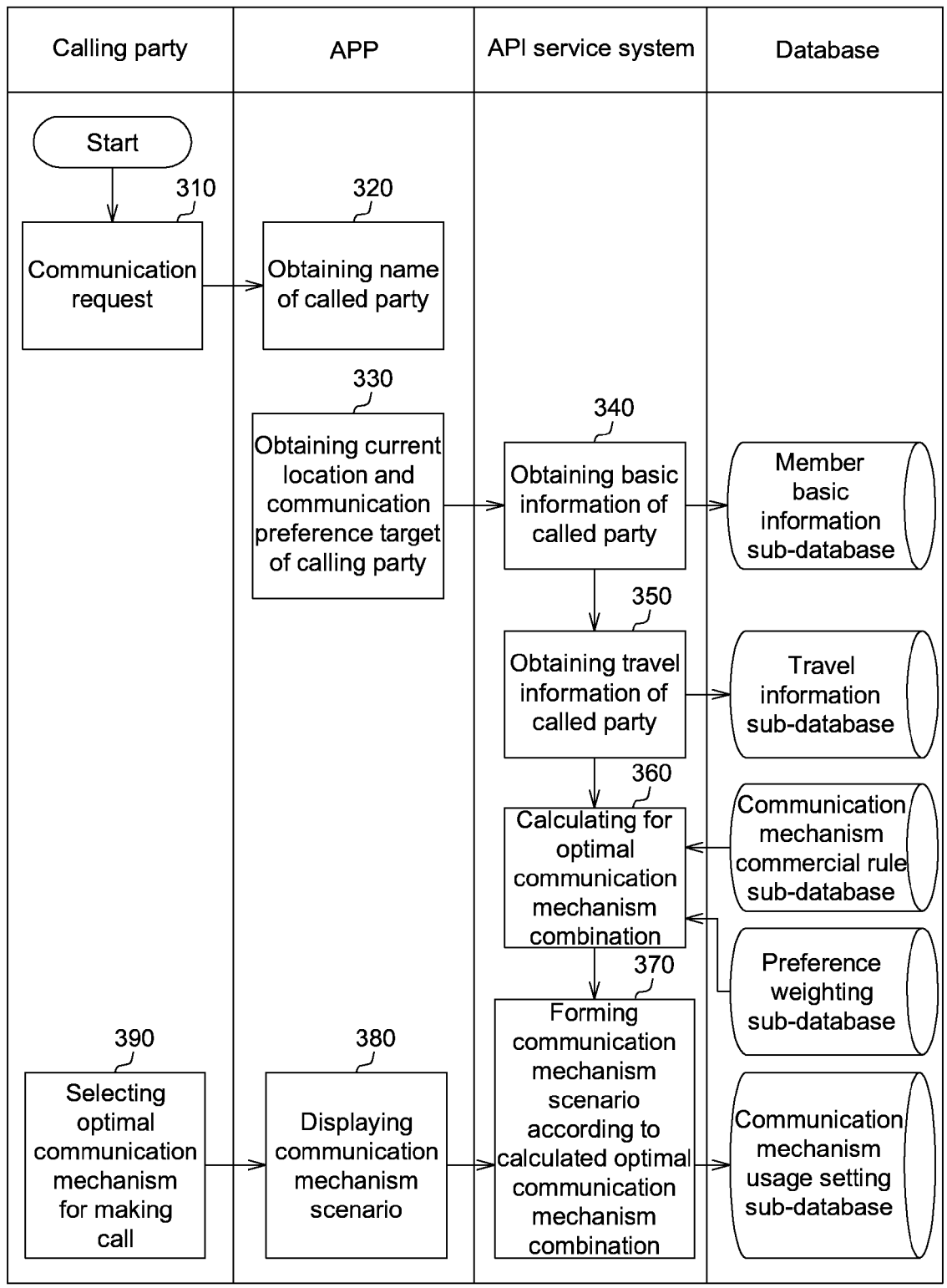
FIG. 3 shows a system flowchart for the communication management system according to the embodiment of the present disclosure.

FIG. 3 shows a system flowchart for the communication administration system 100 according to the embodiment of the present disclosure. As shown in FIG. 3, in step 310, a calling party initiates a communication request. In step 320, an application program (APP), installed on the portable device 140 of the calling party, and obtains a name of a called party entered by the calling party. In step 330, the application program obtains a current location of the calling party and communication preferences (cost and quality) of the calling party. For example, the communication preferences of the calling party are as shown in Table-1 below:

TABLE 1

| Preference weighting | |
|---|---|
| Cost | Quality |
| 70% | 30% |

Taking Table-1 for example, regarding preference weightings, the cost weighting is 70% and the quality weighting is 30%. It means that, in the communication request, the calling party emphasizes higher on the cost and less on the quality. The information (the current location of the calling party and the communication preferences of the calling party) obtained by the application program is sent to the API service system 100a. The communication preferences of the calling party are stored in a preference weighting sub-database of the database 100c.

In step 340, the API service system 100a fetches information of the called party (e.g., a landline extension number, a cell phone number or a group number of the called party) from a member information sub-database of the database 100c.

In step 350, the API service system 100a fetches the travel information of the called party (e.g., the travel destinations and time) from a travel information sub-database in the database 100c, so as to obtain a current location of the called party, which is relevant to the selection of the communication mechanism.

In step 360, the API service system 100a calculates the optimal communication mechanism combination according to information from a communication mechanism commercial rule sub-database and the preference weighting sub-database in the database 100c. The preference weighting sub-database stores preference weightings of the called party, for example, as shown in Table-1. The communication mechanism commercial rule sub-database stores communication options, communication rules, cost and quality.

In step 370, the API service system 100a further fetches a communication mechanism usage setting from a communication mechanism usage setting sub-database of the database 100c, so as to generate a communication mechanism scenario from the optimal communication mechanism combination.

In step 380, the application program of the portable device of the calling party displays the communication mechanism scenario, which includes several communication options for the calling party to select from.

In step 390, the calling party selects the optimal communication mechanism from the communication mechanism scenario to make a call.

In Table-2 below, an example is given for illustrating details for establishing the communication mechanism combinations and the optimal communication mechanism combination. For illustration purposes, in this example, four communication options between a calling party and a called party are available for establishing communication mechanism combinations. Further, in the example of Table-2, it is assumed that a called party is at an overseas branch office. Taking Table-2 for example, calls between the calling and called parties can be made via "cell phones of the called party and the calling party", via "a virtual dedicated network", or via "Internet phone".

TABLE 2

| Communication mechanism combination | | | | | |
|---|---|---|---|---|---|
| Communication option | Location of calling party | Location of called party | Dialing option | Cost ($/min) | Quality |
| Cell phone | Domestic | Overseas branch office | 0911123456 | 30 | 8 |
| Virtual dedicated network (Within corporation) | Domestic (Within corporation) | Overseas branch office | 888, 387, 19878 | 0 | 5 |
| Virtual dedicated network (Outside corporation) | Domestic (Outside corporation) | Overseas branch office | 12345, 387, 19878 | 10 | 7 |
| Internet phone | Domestic | Overseas branch office | 2, 19878 | 0 | 6 |

In Table-2, in the first communication option, the calling party makes a call to the cell phone of the called party by the cell phone of the calling party. That is, the calling party does not utilize the virtual dedicated network or the Internet phone to make a call. In the second communication option, when the calling party is within a US domestic office of the corporation (i.e., the calling party is within the coverage range of an exchanger of a US virtual dedicated network) and the called party is within an overseas branch office (i.e., the called party is within the coverage range of an exchanger of a virtual dedicated network of an overseas branch office), call from the calling party to the called party may be made by the following stages: (1) dialing from the cell phone of the calling party to the exchanger of the US virtual dedicated network (which is not charged because of the contract between the US office and a telecommunication service provider); (2) dialing from the exchanger of the US virtual dedicated network dialing to the exchanger of the virtual dedicated network of the overseas branch office (which is free); and (3) dialing from the exchanger of the virtual dedicated network of the overseas branch office to the cell phone of the called party (which is free). In the third communication option, when the calling party is outside the US office (i.e., the called party is outside the coverage range of the exchanger of the US virtual dedicated network) and the called party is within the overseas branch office, call from the calling party to the called party may be made by the following stages: (1) dialing from the cell phone of the calling party to the exchanger of the US virtual dedicated network (since the calling party is outside the coverage range of the exchanger of the US virtual dedicated network, the calling party needs to pay for this); (2) dialing from the exchanger of the US virtual dedicated network dialing to the exchanger of the virtual dedicated network of the overseas branch office (which is free); and (3) dialing to the cell phone of the called party from the exchanger of the virtual dedicated network of the overseas branch office (which is free). In the fourth communication option, call from the calling party to the called party may be made by the following stages: (1) dialing from the cell phone of the calling party to a server of the Internet phone through the Internet; (2) dialing from the server of the Internet phone to the exchanger of the virtual dedicated network of the overseas branch office also through the Internet (which is free); and (3) dialing to the cell phone of the called party from the exchanger of the virtual dedicated network of the overseas branch office (which is free). "19878" represents the group number of the called party in the virtual dedicated network.

Further, if there are several Internet phone options (e.g., such as Line, Skye, or Lynch developed by Microsoft) available between the calling party and the called party, each type of the Internet phones is regarded as one independent communication option, for which communication rules, communication charges and communication quality need to be defined.

In the embodiment, a dialing rule refers to dialing a predetermined set of numbers to achieve a connection to the destination (i.e. the called party). Taking the second communication option in Table-2 for example, dialing "888" is for connecting the cell phone of the calling party within a corporation to the exchanger of the US virtual dedicated network (compared with the prior art, the calling party has to memorize this), dialing "387" is for connecting the exchanger of the US virtual dedicated network to the exchanger of the virtual dedicated network of an overseas branch office (compared with the prior art, the calling party has to memorize this). Taking the third communication option in Table-2 for example, dialing "12345" is for connecting the cell phone of the calling party outside the corporation to the exchanger of the US virtual dedicated network (compared with the prior art, the calling party has to memorize this). Taking the fourth communication option in Table-2 for example, dialing "2" is for connecting the cell phone of the calling party to the server of the Internet phone (compared with the prior art, the calling party has to memorize this).

Therefore, taking Table-2 for example, a "communication mechanism" may include a communication option and a dialing rule. The communication mechanism combination comprises the communication option, the current location information of the called party, the current location information of the calling party, the dialing rule, the communication cost, the communication quality or any combination thereof.

After obtaining the communication mechanism combination in Table-2, a preference of the calling party is considered to obtain an optimal communication mechanism combination table, as in Table-3.

munication option. Taking the first communication option for example, the cost score (normalized) is 50 and the quality score (normalized) is 80, and so the total score of the first communication option is 50*70%+80*30%=35+24=59. The total score of the other communication options can be obtained similarly. All of the communication total scores are ranked according to their total scores. Taking Table-3 for example, the rankings from high to low are the Internet phone, the virtual dedicated network (within corporation), the virtual dedicated network (outside corporation), and the cell phone.

Figure 4:
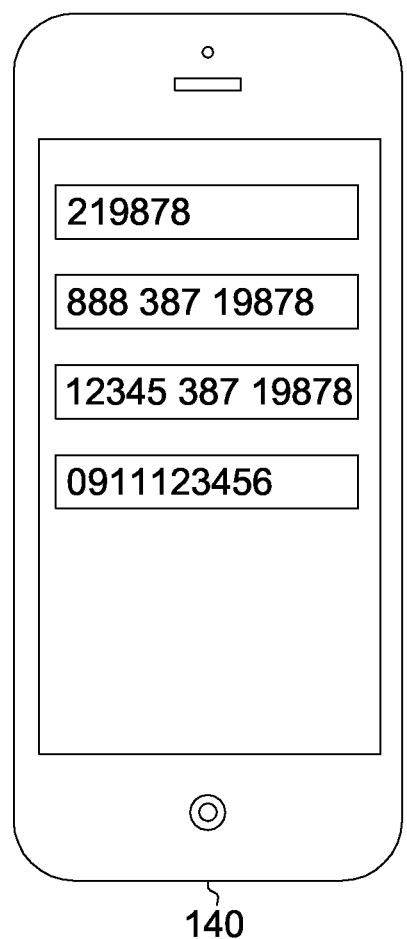
FIG. 4 shows an example of a communication mechanism scenario (displayed at a portable device of a calling party) according to the embodiment of the present disclosure.

According to the optimal communication mechanism combination, a communication mechanism scenario is obtained. The communication mechanism scenario displays phone numbers. FIG. 4 shows an example of a communication mechanism scenario (displayed on the portable device of the calling party) according to an embodiment of the present disclosure. Upon generating the communication mechanism scenario, the API service system 100a transmits the communication mechanism scenario to the portable device 140 of the calling party. Thus, the portable device 140 of the calling party displays several sets of phone numbers, from which the calling party may select one set of phone number for making a call to the called party. In general, for example, the phone number set having higher ranking will be shown at top position.

Again referring to FIG. 1, in the embodiment of the present disclosure, in order to achieve the above functions, the portable device 140 of the calling party at least includes: a (optional) positioning module, for positioning the current location of the calling party via satellite positioning; a communication module, for communication; a data input module, for performing user data input and selection (i.e. user selecting one from the communication mechanism scenario); and an application program, for the calling party to enter a personal preference weighting after the calling party selects a desired called party, receiving the communication mecha-

TABLE 3

Optimal communication mechanism combination table

| Communication option | Location of calling party | Location of called party | Dialing rule | Cost score (normalized) | Quality score (normalized) | Total score | Ranking |
|---|---|---|---|---|---|---|---|
| Cell phone | Domestic | Overseas branch office | 0911123456 | 50 | 80 | 59 | 4 |
| Virtual dedicated network (Within corporation) | Domestic (Within corporation) | Overseas branch office | 888, 387, 19878 | 100 | 50 | 85 | 2 |
| Virtual dedicated network (Outside corporation) | Domestic (Outside corporation) | Overseas branch office | 12345, 387, 19878 | 80 | 70 | 77 | 3 |
| Internet phone | Domestic | Overseas branch office | 2, 19878 | 100 | 60 | 88 | 1 |

In Table-3 above, the cost and quality are normalized. The cost gets lower as "cost score (normalized)" gets higher, and the quality gets better as "quality score (normalized)" gets higher. In Table-1 above, the cost weighting of the user is 70%, the quality weighting of the user is 30%, and such values are utilized for obtaining the total score of each comnism scenario from the API service system 100a for display, and receiving the user selection.

The API service system 100a includes a communication mechanism combination calculation module for generating the optimal communication mechanism combination table according to calculation of the user preference weighting, the travel information and the dynamic information (such as the locations of the calling/called party).

The administration system includes: a member basic information module, for maintaining basic information of members and available communication options for the members; a travel information module, for maintaining travel information (travel time and destinations) of the members; a corporation/branch office/factory position information module, for maintaining associated position information (e.g., a GPS location, a range, a located country, a located region (a province and/or city)) of the corporation/branch office/factory; and a communication mechanism rule module, for maintaining communication mechanism rule information (the communication method, dialing option, cost and quality).

As demonstrated by the embodiments of the present disclosure, current conditions of a member (the position of the calling/caller party), various communication mechanisms, situations and user preferences are considered to obtain an optimal communication mechanism. Further, the communication mechanisms are combined for the members to select from. Therefore, the members do not have to memorize usage conditions and usage rules of various communication mechanisms nor learn how to combine an optimal communication mechanism. Even conditions of the members are changed, the system is capable of dynamically adjusting to the optimal communication mechanism. As such, the user is able to select the optimal communication mechanism for making a call in all circumstances.

Another embodiment of the application is applicable in social application. For example, when a cell phone of a user installs an application program according to the embodiment of the present application, the users may be grouped, into which friends, coworkers and family are added. It should be noted that the cell phone of each member of the group needs to install the application program. The member of the group inputs his/her preference weighting, communication option and communication rule into the application program. Further, the application program may also download a cost plan of a telecommunication service provider or a user may input his/her current cost plan into the application program. Thus, when the user makes a call to a member in the group, the application program automatically recommends the best/ most economic/most suitable cost plan for the user, so that the user is not required to memorize which cost plan to be utilized for making the call.

In contrast, without the application program, in order to save call costs, the user needs to memorize or search for a most economical cost plan for making the call, which may be quite disturbing to the user.

While the disclosure has been described by way of example and in terms of the preferred embodiments, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A communication administration system, comprising:
   an administration system, for managing a basic information of at least one user; and
   a service system, for fetching basic information and current location information of a called party from the administration system in response to a communication request from a calling party, obtaining current location information and preference information of the calling party from the calling party, and generating a communication mechanism scenario according to a communication mechanism system factor for the calling party to make a selection and make a call accordingly;
   the service system selects an optimal communication mechanism combination among a plurality of communication mechanism combinations to generate the communication mechanism scenario; and
   the service system normalizes the communication mechanism combinations to rank the normalized communication mechanism combinations for generating the optimal communication mechanism combination according to the preference information of the calling party.

2. The communication administration system according to claim 1, wherein the administration system further manages geographic address information of factories or branch offices of a corporation.

3. The communication administration system according to claim 2, further comprising:
   a database, for storing the basic information of the at least one user, a travel information of the called party, and the preference information of the calling party;
   wherein, the service system fetches the current location information of the called party according to the current travel information of the called party and the geographic address information of the factories or the branch offices of the corporation.

4. The communication administration system according to claim 1, wherein the current location information of the calling party is automatically obtained by a portable device of the calling party, or manually entered into the portable device by the calling party.

5. The communication administration system according to claim 1, wherein when a change occurs in at least one of the current location information of the called party, the current location information of the calling party, the preference information of the calling party and the communication mechanism system factor, the service system dynamically generates or updates the communication mechanism scenario.

6. The communication administration system according to claim 1, wherein the basic information of the called party comprises a landline extension number, a cell phone number, and/or a group number.

7. The communication administration system according to claim 1, wherein the communication mechanism system factor comprises a communication mechanism range, a communication mechanism setting, a communication mechanism cost, and/or a communication rule.

8. The communication administration system according to claim 1, wherein each of the communication mechanism combinations comprises a communication option, the current location information of the called party, the current location information of the calling party, a dialing setting, a communication cost, and/or a communication quality.

9. The communication administration system according to claim 1, wherein the communication mechanism scenario is displayed on a portable device of the calling party, the communication mechanism scenario comprises a plurality of dial strings each corresponding to one of the communication mechanism combinations, and in response to a selection from the calling party, the portable device dials to the called party according to the selected dial string.

* * * * *